Aug. 11, 1970 D. G. KILLION ET AL 3,524,190

EXTENDABLE RADIO FREQUENCY TRANSMISSION LINE AND ANTENNA STRUCTURE

Filed Nov. 20, 1967 4 Sheets-Sheet 1

INVENTOR.
DERLING G. KILLION
FLOYD B. SHACKLOCK
BY Carl R. Brown
ATTORNEY

INVENTOR.
DERLING G. KILLION
FLOYD B. SHACKLOCK
BY
Carl R. Brown
ATTORNEY

INVENTOR.
DERLING G. KILLION
FLOYD B. SHACKLOCK
BY Carl R. Braun
ATTORNEY

INVENTOR.
DERLING G. KILLION
FLOYD B. SHACKLOCK
BY Carl R. Brown
ATTORNEY

United States Patent Office 3,524,190
Patented Aug. 11, 1970

3,524,190

EXTENDABLE RADIO FREQUENCY TRANSMISSION LINE AND ANTENNA STRUCTURE

Derling G. Killion and Floyd B. Shacklock, San Diego, Calif., assignors to The Ryan Aeronautical Co., San Diego, Calif., a corporation of California Filed Nov. 20, 1967, Ser. No. 684,907
Int. Cl. H01q *1/12, 1/08, 13/22*
U.S. Cl. 343—771 22 Claims

ABSTRACT OF THE DISCLOSURE

A tubular transmission line and antenna for coaxial or wave guide radio frequency energy transmission that may be collapsed into a coil shape and selectively extended to a rigid structure and that forms an antenna array.

BACKGROUND OF THE INVENTION

There are many separate and different structures for radiating radio frequency waves and functioning as transmission lines for supplying radio frequency energy to the antennas. The particular structures used are normally dictated by the particular beam shape to be radiated and the environment in which the transmission lines and antennas are to be used. When antennas are used in ground installations, in easily accessible places and where permanent installations are desired, then heavy, complicated, permanent antenna structures may be used. However, where an antenna is to be used, as for example in space, on board ship, on aircraft or in inaccessible places where transportation is difficult and permanent installations are not desired, then it is advantageous to use a light weight and easily deployable transmission line and antenna. Further, while there are known light weight antennas that may be assembled on site, these antennas are complicated in construction, require a considerable amount of time to assemble to operative condition, are often bulky and require considerable space to deliver to a given site, and when installed, are difficult to disassemble and repack.

Thus it is advantageous to have a radio frequency transmission line and antenna structure that may be coiled into a small package and transported to a given place of use, and then unreeled into an already constructed and deployed transmission line and antenna array structure. After use, the transmission line and antenna are easily re-rolled into a coil for subsequent use. Such an antenna is easily and quickly installed, compact, inexpensive to manufacture, light weight, and has particular use in spaceborne antenna applications.

SUMMARY OF THE INVENTION

The embodiment of the extendable radio frequency transmission line and extendable radio frequency antenna of this invention generally comprises a longitudinal tubular structure having facing side walls made of thin spring material with aligned edges that are joined along their longitudinal length. The sides are preformed to spring outwardly to a curved configuration, drawing the joined longitudinal edges inwardly toward each other and forming a substantially cylindrical, rigid, tubular structure. The entire longitudinal tubular structure may be collapsed to a flat condition with the sides being substantially parallel, upon an inward force being applied to the outer surface of the curved sides. The entire structure may thus be flattened and coiled on a reel or the like for transportation to points of use. The transmission line and antenna is then selectively unwound to a desired length, whereupon the sides spring outwardly forming a rigid, longitudinal tubular structure that resists torsional stresses. The tubular structure may function as a wave guide radio frequency energy transmission line or there may be mounted inside the tubular structure, a substantially rigid insulator plate that has a radio frequency energy conductor or conductors thereon for coaxial transmission.

The insulator plate is held with the longitudinal tubular structure by any of the several preferred arrangements that assure the aligned positioning of the radio frequency energy conductor in a central position within the tubular structure. The insulator plate limits the outward expansion of the sides of the tubular structure assuring consistent dimensions of the tubular structure and functions to increase the strength of the tubular structure. The plate and conductor do not have any surrounding packing or other material that would interfere with the transmission of the radio frequency waves through the conductor or the radiation of radio frequency energy from the conductor through appropriate beam radiating means. The tubular structure forms a radio frequency transmission line and a portion of the structure forms an antenna by having radiator slots or dipoles projecting through the sides of the tubular structure. As an example, the sides may be made of spring steel and the radiating slots may be appropriately shaped apertures cut therethrough. In another embodiment, the sides may be made of fiberglass or laminated plastic with an outer conductive coating with open sections of the coating forming the radiating slots. Thus the radiating slots are formed by openings in the conducting portion of the sides of the tubular structure that forms an essential part of the transmission line and antenna structure. The particular configuration of the slots may take any of several suitable forms as will be described hereinafter. Dipole radiators and loop antennas may also be installed along the length of the tubular structure either singly or in multiple combinations. The dipole radiators collapse with the sides and coil with the insulator plate and the tubular structure for quick storage and positioning.

It should also be recognized that the invention may function as a transmission line, or as an antenna structure, or as an integral combination of the two with the transmission line supplying radio frequency energy to the antenna structure portion. It should also be recognized that our invention may be utilized as a wave guide to transmit radio frequency energy inside the hollow structure of the tubular structure. Also the insulator plate may carry a plurality of conductors, such as a pair of conductors carrying radio frequency signals that are 180 degrees out of phase, for transmission through the line and radiation through the antenna arrays.

Thus the collapsible radio frequency transmission line of this invention provides a light weight, erectible, structure to provide radio frequency energy transmission, either coaxial or wave guide, and which transmission line may be stored in a small volume and deployed into large and extended rigid structure. The material used in the sides of the transmission line is resilient and prestressed to the deployable shape and is conductive at radio and microwave frequencies. The support of the conductor in a coaxial embodiment has dielectric properties at the radio or microwave frequencies. The device can be collapsed by rolling it. The radio frequency and microwave transmission line and antenna has wide applications for use in requirements of unfurlable transmission lines and antennas.

It is therefore an object of this invention to provide a new and improved radio frequency transmission line.

It is another object of this invention to provide a new and improved integral radio frequency transmission line and antenna having either coaxial or wave guide transmission.

It is another object of this invention to provide a collapsible and extendable radio frequency transmission line and antenna that may be rolled into a compact assembly and be unfurled into an extended, rigid, antenna array structure.

It is another object of this invention to provide a new and improved extendable radio frequency transmission line and antenna that may be used in many classes of antennas.

It is another object of this invention to provide a new and improved extendable radio frequency transmission line and antenna that utilizes a collapsible boom as the feed structure.

It is another object of this invention to provide a new and improved extendable radio frequency transmission line and antenna structure wherein the erectable structure provides either coaxial or wave guide radio frequency transmission to an integral antenna array structure.

Other objects, novel features, and advantages of this invention will become more apparent upon a review of the following detailed specification and the attached drawings in which.

Figure 1:
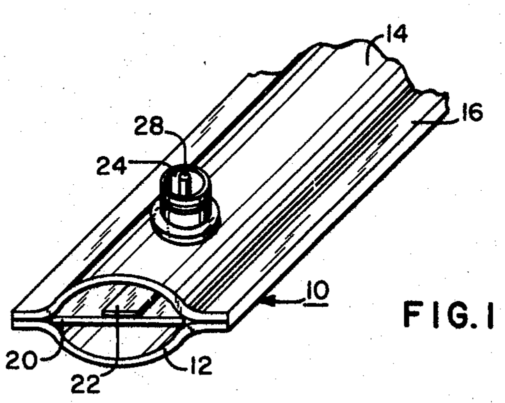
FIG. 1 is a perspective view of an embodiment of the collapsible radio frequency transmission line in an expanded condition.
Figure 14:
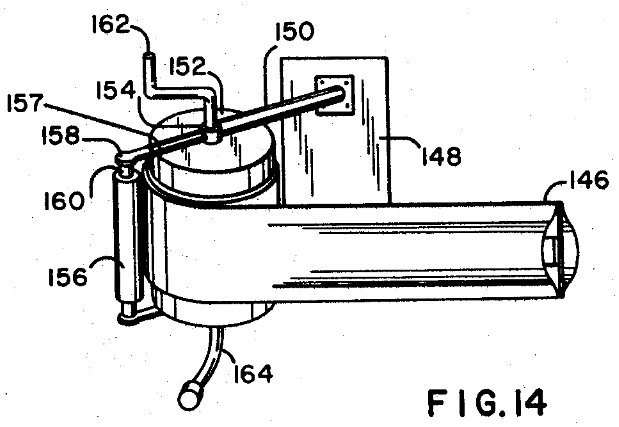
FIG. 14 is a side view illustrating means for coiling and extending the collapsible radio frequency transmission line and antenna.

Referring now to FIG. 1, there is illustrated an embodiment of the extendable and collapsible radio frequency transmission line having a pair of aligned sides 12 and 14 that may be made of any suitable, conducting, thin spring material. For example, the material may be spring steel, titanium, or the like, or the material may be a non-conductive material such as fiberglass or laminated plastic having a conductive outer metal layer that is added by plating, fillers, or by conductive tape coatings. The outer edges 16 are joined together in any suitable known manner and in its uncompressed condition, the longitudinal tubular structure has the shape substantially as illustrated. The exact configuration of the channel running through the tubular member is dependent upon the particular preformed curved shape given the outer spring members 12 and 14. It should be recognized that by applying compression against the outer curved surfaces of the sides 12 and 14, the tubular structure 10 collapses into a substantially flat surface that may be selectively coiled by a reel apparatus such as illustrated in FIG. 14. Positioned in the tubular structure 10 is a flat, substantially rigid, insulator plate 20 that has dielectric properties at radio or microwave frequencies. This insulator plate 20 may be made of fiberglass or of any other suitable material. Mounted on the insulator plate 20 is a centered conductor 22 that is conductive at radio frequency or microwave frequencies. The insulator plate 20 while being rigid across its width dimension is capable of being bent in its longitudinal dimension to coil with the flattened tubular structure 10.

Figures 8, 13:
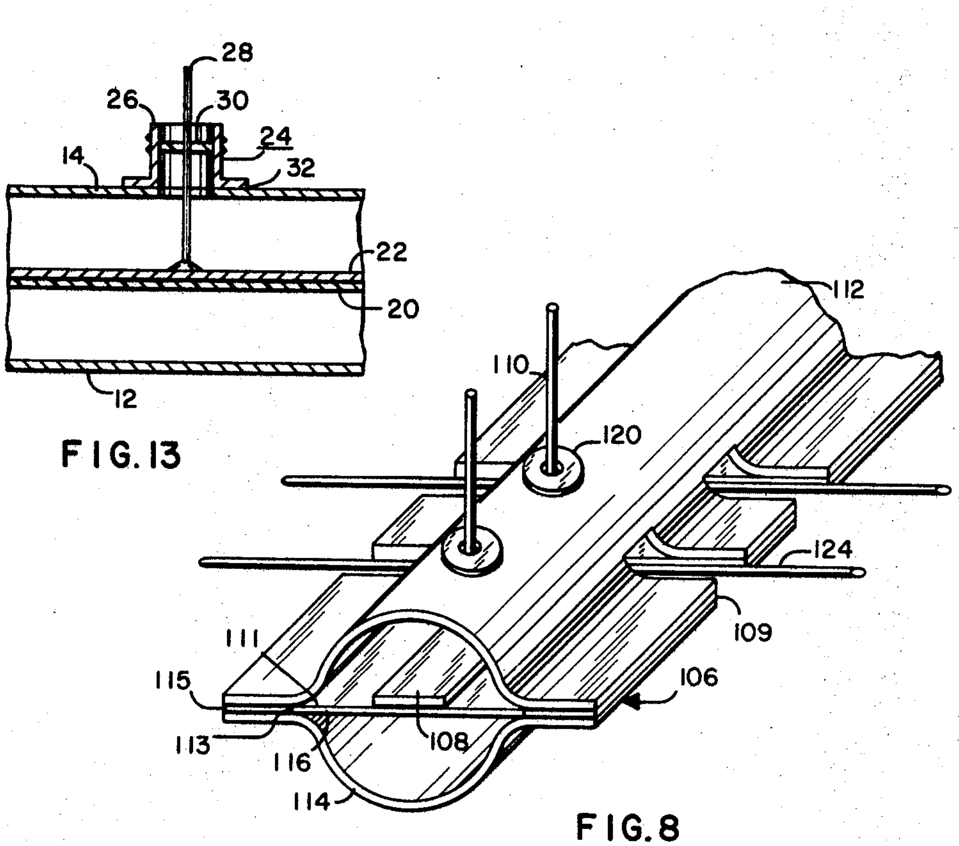
FIG. 8 is a perspective view of an embodiment of the invention utilizing coaxial transmission and having dipole element radiators.
FIG. 13 is a cross-sectional view illustrating the coaxial attachment for supplying radio frequency signals to the collapsible radio frequency transmission line illustrated in FIG. 1.

A well known coaxial connector 24, see FIG. 13, supplies the radio frequency energy to the transmission line. The outer housing of the coaxial connector 26 is secured to the outer conductive surfaces of the sides of the transmission line with a center conductor pin 28 secured to the longitudinal conductor 22. The pin is supported in the threaded connector 24 by a disk insulator 30 in the known manner. It should be recognized that the two sides 12 and 14 are electrically connected so that their entire outer surface provides a conductor means. It should also be recognized that a similar coaxial connector 24 may be positioned at another location along the length of the transmission line for removing radio frequency energy as desired.

Figure 4:
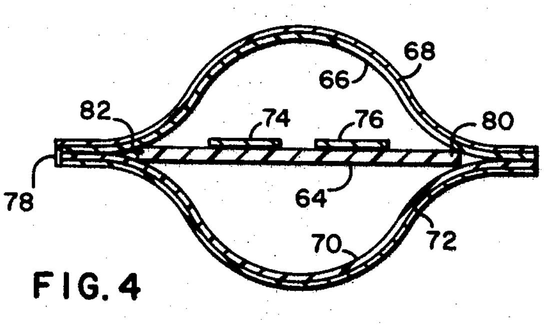
FIG. 4 is a cross-sectional view of still another modified embodiment of the collapsible radio frequency transmission line and antenna structure of this invention.

The insulator plate 20, as illustrated in FIG. 1, has a construction substantially as illustrated in the cross-sectional view of FIG. 4, wherein the edges of the insulator plate are not connected to the tubular structure but rather are aligned and compressed between the inner surfaces of the connected edges 16 of the tubular structure upon expansion of the sides of the tubular structure 10. Thus the conductor member 22 is appropriately centered within the tubular structure 10 for optimum radio frequency transmission. As illustrated in FIG. 4, the side members comprise suitable, insulating spring material 66 and 70 having outer conductor coatings 68 and 72. The edges of the sides are secured together in any suitable manner and, although it may not always be necessary, where very high frequencies are transmitted, the conductive coatings may overlap at least one edge 78 of the sides to provide uniform passage of radio frequency energy throughout the entire surface of the conductor coatings 68 and 72. The insulator plate 64 has edges 80 and 82 that fit into the V-shaped spaces between the two sides upon expansion of the tubular structure thereby holding the insulator plate in the desired position throughout its length. A pair of longitudinal conductors 74 and 76 are deposited or secured to the insulator plate and afford transmission of radio frequency energy through the tubular structure. The conductors 74 and 76 may respectively carry radio frequency energy that is 180° out of phase.

Figure 2:
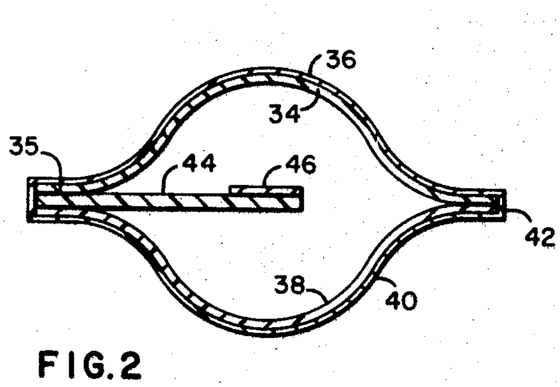
FIG. 2 is a cross-sectional view of a modified embodiment of the collapsible radio frequency transmission line and antenna structure of this invention.

Referring to FIG. 2, another embodiment of the invention also has sides made of fiberglass or other suitable insulating material 34 and 38 with outer conductive coatings 36 and 40 and an edge coating 42. An insulator plate 44 is secured at one edge between the edges of sides 34 and 38 in any suitable manner, such as by cementing or the like, and is thus held thereby. The width of the insulator plate 44 extends beyond the center of the tubular structure and has a longitudinal conductor 46 positioned thereon.

Figure 3:
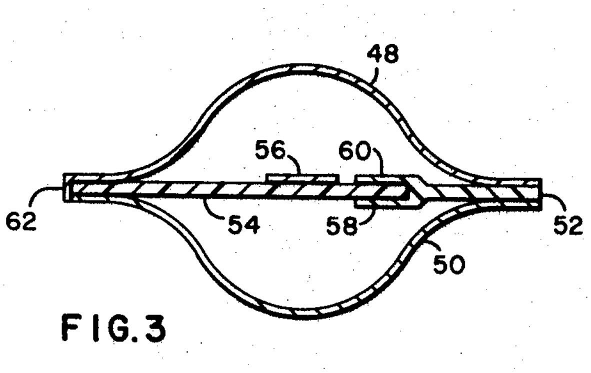
FIG. 3 is a cross-sectional view of still another modified embodiment of the collapsible radio frequency transmission line and antenna structure of this invention.

Referring to FIG. 3, still another means for supporting the insulator plate is provided wherein the insulator plate 54 has one side secured between the edges of one side of members 48 and 50 and the other side fits between sliding sides 58 and 60 of a second insulator plate member 52. The side of the insulator plate member 54 slides within the sides 58 and 60 thereby holding the plate members 52 and 54 in alignment during outward and inward flexing of the sides 48 and 50. The conductor member 56 is supported on the insulator plate 54 in the manner previously described.

It should be recognized that the illustration of FIG. 3 is merely representative and that while the sides 48 and 50 are shown to be made of metallic conducting material, the sides can also be constructed in the manner illustrated in FIGS. 2 and 4. Also the U-shaped slot formed by the sides 58 and 60 can have any depth commensurate with the dimensions of the tubular structure. However, the slot depth will always be of sufficient depth to maintain sliding and supporting contact with the side edge of plate 54, regardless of the extent of outward movement of the side edges of sides 48 and 50 upon the sides 48 and 50 being compressed to a flattened condition by a compression force. Further in this regard, in all the views of the sides of the tubular structure, the insulator plates and the longitudinal conductors; they are, for illustration purposes, shown to have a viewable thicnness. It should be understood that these structures are normally very thin and thus are compressed to a substantially flat structure upon being coiled.

Figure 6:
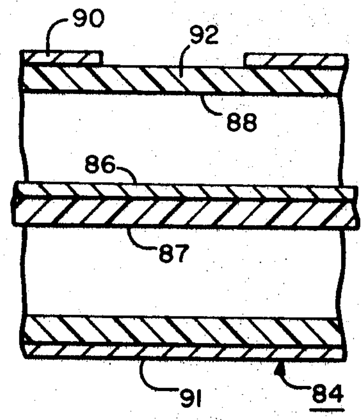
FIG. 6 is a cross-section view taken along lines 6—6 of FIG. 5.
Figures 5, 7, 12:
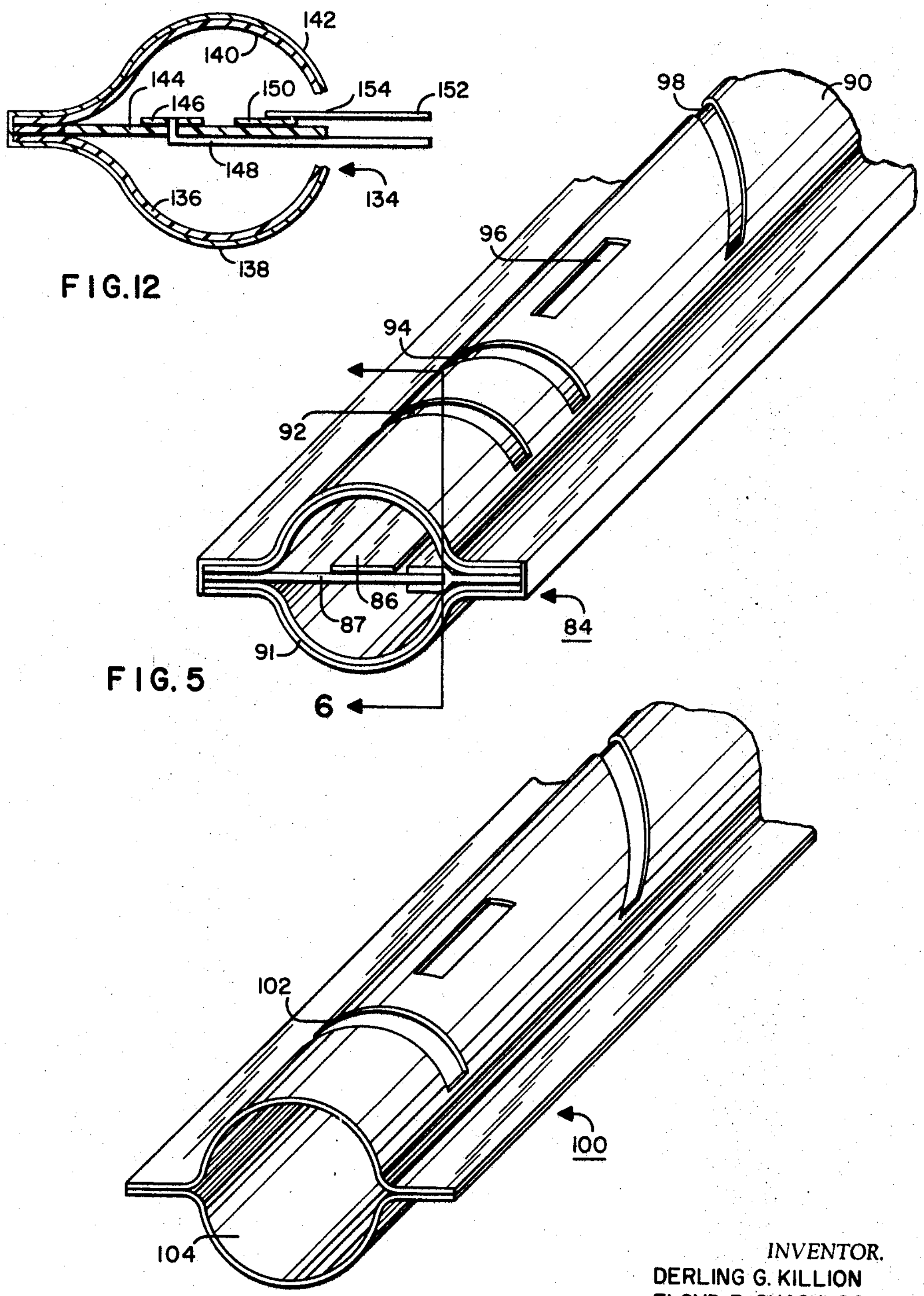
FIG. 5 is a perspective view of a portion of the collapsible radio frequency transmission line and antenna structure of this invention illustrating the slot element radiators.
FIG. 7 is a perspective view of the collapsible radio frequency transmission line and antenna of this invention as used in wave guide transmission mode and illustrating slot element radiators.
FIG. 12 is a cross-sectional view illustrating the securing of the ends of the loop element of FIG. 11 to the pair of longitudinal conductors forming the transmission line.

Referring now to FIG. 5, there is illustrated an antenna structure that is normally integral with the extendable radio frequency transmission line that supplies radio frequency energy thereto. The antenna structure 84 comprises a longitudinal tubular structure as previously described having a pair of sides 90 and 91 that expand inwardly and outwardly with an insulator plate 87 having a longitudinal conductor 86 positioned in the tubular structure. While the particular insulator plate installation illustrated in FIG. 5 is the same as that previously described and illustrated in FIG. 3, it should be recognized that the insulator plate can also be secured in the manner illustrated in FIGS. 2 and 4. It is necessary that the conductor 86 and insulator plate 87 be correctly positioned relative to the cross-sectional dimension of the tubular structure 84. Further in this embodiment, the tubular structure of the antenna structure 84 comprises sides having the inner insulating structure coated by an outer surface of radio frequency conducting material, which construction has previously been described relative to FIG. 2. Portions 92, 94, 96 and 98 have not been coated with the radio frequency conducting material and these noncoated areas have a configuration and are so oriented as to form slot element radiators. The insulating side material has dielectric properties that pass radio frequency energy therethrough. Any configuration of slot element radiators may be provided in the manner previously described to provide an antenna array. FIG. 6 is a cross-sectional view that is taken through FIG. 5 along lines 6—6 and illustrates the construction with the slot radiator portion having the conductive coaing removed or not coated.

Figure 15:
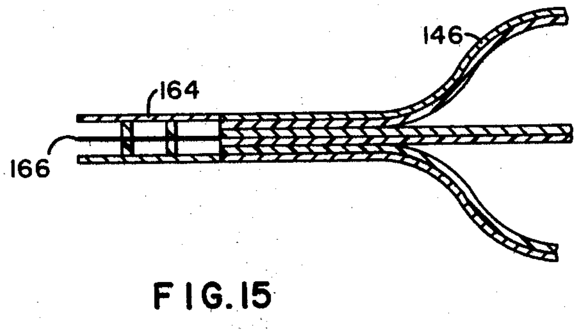
FIG. 15 is a cross-sectional view illustrating the means of supplying radio frequency energy through a conventional coaxial transmission line to the collapsible radio frequency transmission line.

The antenna structure illustrated in FIGS. 5, 7, 8, 10 and 11 are sections of a tubular structure that is normally integral with a long section of the tubular structure, which long section functions as the radio frequency transmission line for supplying radio frequency energy to the antenna array. However it should be recognized that the antenna structure can be used separately from the transmission line and be supplied with radio frequency energy in the manner illustrated in FIG. 15 or in some other known manner. Further while the ends of the antenna sections illustrated are open, this is for illustration purposes and the ends can be closed as necessary or desired either by a flat insulated end plate, a conductive end plate, RF absorbing load, or by compression of the collapsible sides as illustrated in FIG. 15.

FIG. 7 illustrates a slotted wave guide array as distinct to the slotted coaxial line array illustrated in FIG. 5. In FIG. 7 the wave guide array comprises a longitudinal conductive, tubular structure 100 as previously described that does not have the insulator plate or the longitudinal conductor and transmits radio frequency energy through the wave guide in the manner known in the art. The slot radiator portions are cut through the conductive side to form the antenna array. While this form of construction partially reduces the strength of the collapsible boom structure and permits air to penetrate into the internal volume of the tubular structure, such construction is often advantageous where short lengths of radio frequency transmission line and antenna structures are desired. Further the openings, if desired, can be bridged over with patches of dielectric material (not shown) secured thereto in the known manner to close the openings and the insulator plate, when used, increases the strength of the structure.

Figure 9:
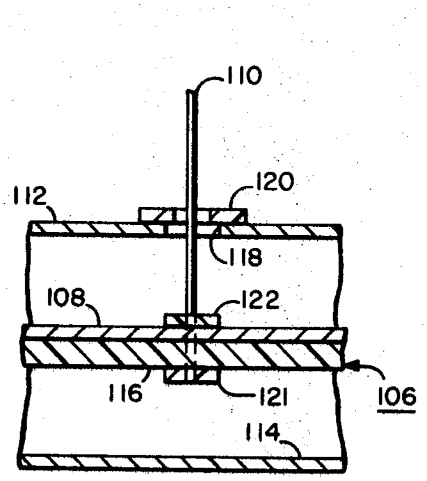
FIG. 9 is a cross-sectional view taken along a length of the embodiment illustrated in FIG. 8 that illustrates the construction and arrangement for securing the dipole element radiators.

FIG. 8 illustrates another embodiment of the radio frequency antenna structure wherein the longitudinal tubular structure has a pair of sides 112 and 114 with a conductor 108 supported on the insulated plate 116 running therethrough and forming a coaxial line. The antenna portion of the coaxial line of the collapsible boom structure has dipole element radiators 110, see FIG. 9, that project through apertures 118 in the side member 112 and are connected by suitable connecting means 121 and 122 to the longitudinal conductor 108 and the insulator plate 116. In this embodiment, the sides 112 and 114 are illustrated as being made of, for example, spring tempered steel or other suitable constructing materials, however it should be recognized that this dipole element radiator construction could also use the dielectric sides with the previously described conductive coating. An insulator disk 120 is secured around the aperture 118 and through which the dipole element radiator 110 projects. This insulated disk 120 functions to position the dipole radiator while preventing it from contacting the conductive side 112. The dipole element radiators 110 may have any desider length and may be made of any suitable material that is resilient and flexible enough to bend upon collapsing the coiling of the tubular structure 106 and yet be sufficiently spring biased to assume an erected position upon extension of the antenna structure 106. The dipole element may be flat, round, or may comprise a spiral spring, or have other suitable known constructions.

Dipole elements 124 project through openings in the side edges of the tubular structure 106 and are secured to the conductor 108 in a manner that will be described hereinafter relative to FIG. 11. The dipole elements 124 will have a construction similar to that of dipole element radiators 110 to permit bending as may be necessary in the coiling of the tubular structure 106.

In the embodiment of FIG. 8, the edges of the sides 112 and 114 are joined with a thin spacer plate 115 therebetween. This spacer plate provides added strength adjacent the openings 109 and further provides a U-shaped recess for receiving the side edges of the insulator plate 116 that is loosely secured in the tubular structure in the manner previously described relative to FIGS. 1 and 4. Also as will be more apparent hereinafter relative to FIGS. 11 and 12, the insulator plate 116 can be provided with a pair of spaced longitudinal conductors to which dipole elements 110 and 124 are connected.

Figure 10:
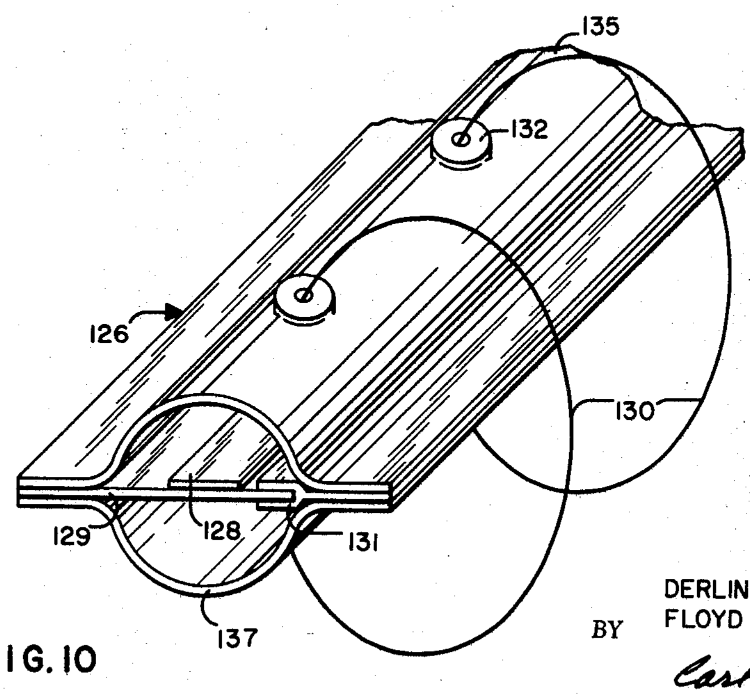
FIG. 10 is a perspective view of a coaxial transmission line embodiment of this invention used as an antenna and having loop element radiators arranged in a loop array.

FIG. 10 illustrates the installation of loop element radiators 130 that have one end passing through apertures in the conductive side 135 of the tubular structure and being supported by an insulator disk 132. The one end is secured to the longitudinal conductor 128 in the manner previously described relative to FIG. 8. The other end of the loop element radiators 130 is secured to the conductive surface of the underneath side 137 of the tubular structure 126. Also the other end of the loop element radiators 130 may also project through similar apertures and disks 132, and may connect to another conductor aligned next to conductor 128 on the insulator plate positioned in the tubular structure 126. It may be observed that the insulator stabilizing means 131 functions in the manner previously described relative to FIG. 3.

Figure 11:
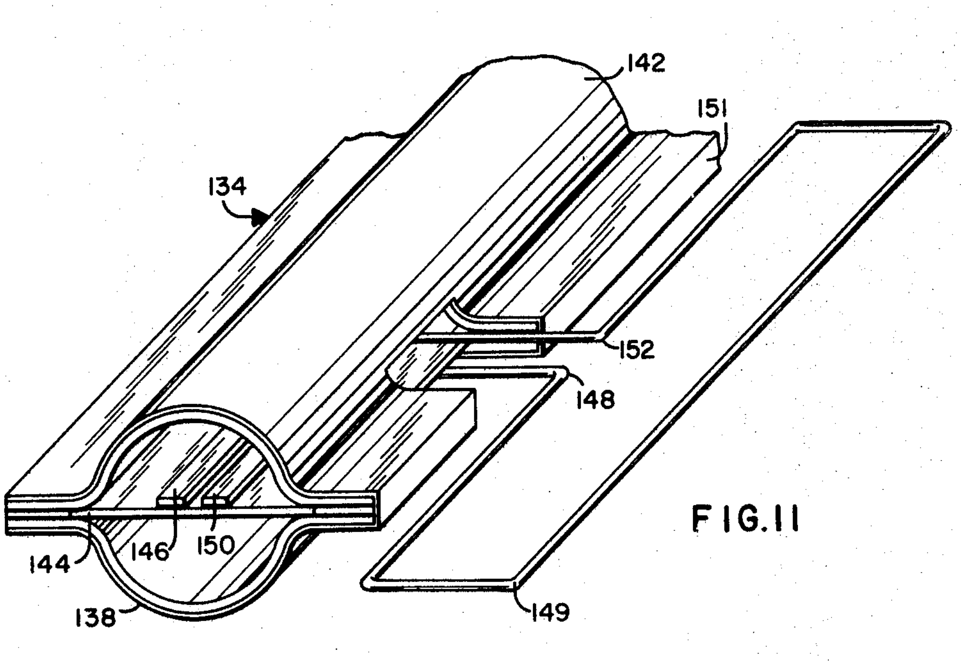
FIG. 11 is a perspective view of an embodiment of this invention having a pair of conductors for transmitting radio frequency energy through the transmission line and having a loop antenna array secured thereto.

Referring to FIGS. 11 and 12, another embodiment of the loop element radiator array 149 projects through an opening in the sides of the tubular structure 134 and the loop element radiator is supported by a pair of end members 148 and 152 that are respectively connected to the two longitudinal conductors 146 and 150 in the manner illustrated in FIG. 12, or are connected to the conductor 150 and to the outer conductive portion of the tubular structure. The two longitudinal conductors 146 and 150 are supported on an insulator plate 144 that is positioned in the tubular structure in the manner previously described relative to FIG. 8. The conductors 146 and 150 may be supplied with radio freqeuncy energy that is 180 degrees out of phase. The construction of the loop array 149 is the same as that previously described relative to the dipole element radiators 110 and 124 and thus may be coiled with the collapsed tubular structure 134 and to return to the substantially rigid configuration illustrated in FIG. 11 upon extension of the collapsible tubular structure.

OPERATION

The extendable and collapsible radio frequency transmission line and antenna structure of this invention has many diverse uses and applications, either as individual components or in the unique combination, as will be apparent to those skilled in the art, and may be used in many environments with particular advantages in being used as transmission lines and antennas for space borne side looking radars. The coaxial or wave guide transmission line and integral antenna structure can be coiled on a reel 152, see FIG. 14, whreein the reel 152 is supported by appropriate brackets and arms 150 that are secured to a wall mount or the like 148. The outer ends of the bracket arms 150 are secured to bearing members 154 through which a crank 162 projects to rotate the reel 152 in the known manner. Also mounted to bearings 154 is a Teflon coated rolling pin 156 mounted on an axle 160 that is spring biased inwardly toward the reel 152 by means of a known telescoping resilient support 157 that is secured to the axle 160 by bearing connections 158. Thus it may be seen that by turning crank 162, the collapsible and extendable transmission line and antenna structure 146 may be selectively extended or reeled into a retracted position. A coaxial feed line 164 passes through the reel drum 152 and is electrically connected to the collapsed end of the boom structure 146, as illustrated in FIG. 15. A known rotatable electrical connection (not shown) is provided in feed line 164 to permit rotational movement thereof. The center conductor 166 of the coaxial feed line 164 is electrically connected to the longitudinal conductor and the outer conductor is slotted at its sides to solely connect to the conductive outer surfaces of the tubular structure 146.

Thus it may be seen that the transmission line and antenna structure 146 may be reeled out to any given length to provide the desired position of the antenna structure while providing a transmission line for radio frequency energy to the antenna array.

The sides of the tubular structure are preformed to spring outwardly a given amount and this provides a given, stable, outer dimension. However, upon repeated compression of the sides by, for example, reel 152 or when the tubular structure is held in the compressed condition for long periods of time, then the preformed spring force of the sides tends to diminish and upon expansion, the stable, outer dimensions of the tubular structure changes. To prevent this in our invention, the sides are preformed to spring outwardly and to draw the ends inwardly an amount greater than desired. The insulator plate has a width that is larger than this inward movement and thus holds the sides and the edges to given dimensions. So even though the spring force of the sides diminishes, the force is always sufficient to grip the insulator plate and cause the tubular structure to assume a stable and predictably consistant configuration. Also this gripping of the insulator plate increases the structural strength of the tubular structure.

It is to be understood that minor variations from the form of the invention disclosed herein may be made without departing from the spirit and scope of the invention and that the specification and drawings are to be considered as merely illustrative rather than limiting.

Having disclosed our invention, we now claim:

1. An extendable radio frequency transmission line and antenna structure comprising,
   - a longitudinal tubular structure having aligned sides of thin spring material that are joined at their longitudinal edges,
   - said sides being radio frequency conducting and being preformed to spring outwardly to a curved configuration upon being released forming a tube and to be compressed to a substantially flattened position,
   - said tubular structure being capable in the compressed condition of being flexed into a coil and upon release to spring into a longitudinal tubular structure,
   - a flat, longitudinal, rigid, insulator plate positioned in said tubular structure in alignment with said sides in said flattened position,
   - said plate being capable of being coiled with said tubular structure, and
   - a longitudinal conductor being secured to said plate.

2. An extendable radio frequency transmission line and antenna structure according to claim 1 including,
   - connector means for applying radio frequency energy to said longitudinal conductor and said conductor surface of said tubular structure.

3. An extendable radio frequency transmission line and antenna structure according to claim 2 in which,
   - said connector means comprising at least one coaxial feed connector secured to one of the sides of said tubular structure, and
   - a pin projecting through aligned openings in said feed connector and said side and contacting said longitudinal conductor.

4. An extendable radio frequency transmission line and antenna structure according to claim 1 in which,
   - said insulator plate having a width such that its edges are compressed between the inner surfaces of the joined side edges of said tubular structure upon said sides of said tubular structure springing outwardly to said curved configuration.

5. An extendable radio frequency transmission line and antenna structure according to claim 4 including,
   - a second longitudinal conductor being secured to said insulator plate in a position parallel to said longitudinal conductor.

6. An extendable radio frequency transmission line and antenna structure according to claim 1 in which,
   - one edge of said insulator plate being secured between one of the joined longitudinal edges of said sides,
   - the other edge of said insulator plate extending to a location adjacent the center of the longitudinal opening in said tubular structure, and
   - said longitudinal conductor being secured to said plate adjacent said other edge.

7. An extendable radio frequency transmission line and antenna structure according to claim 1 in which, one edge of said insulator plate being secured between one of the joined longitudinal edges of said sides, the other edge of said insulator plate extending to a location beyond the center of the longitudinal opening in said tubular structure, an insulator plate holder having a flat portion and a U-shaped portion secured to said flat portion, the edge of said flat portion being secured between the other joined longitudinal edges of said sides with said other edge of said insulator plate being positioned between the sides of said U-shaped portion.

8. An extendable radio frequency transmission line and antenna structure according to claim 1 in which, at least one of said sides having a radio frequency energy radiator.

9. An extendable radio frequency transmission line and antenna structure according to claim 8 in which, said radiator comprising a radio frequency energy transmitting slot in said side.

10. An extendable radio frequency transmission line and antenna structure according to claim 1 in which, said sides comprising an insulating material that is capable of passing radio frequency energy therethrough, and said sides having an outer coating of conducting material.

11. An extendable radio frequency transmission line and antenna structure according to claim 10 in which, portions of the outer surface of said sides being uncoated by said coating of conducting material, and said uncoated portions having configurations forming slot element radiators of radio frequency energy.

12. An extendable radio frequency transmission line and antenna structure according to claim 1 in which, one of said sides having at least one opening, a dipole element radiator being secured to said conductor and projecting out through said opening, and said radiator being capable of being coiled with said tubular structure.

13. An extendable radio frequency transmission line and antenna structure according to claim 12 in which, said opening having an insulator means secured to said side and projecting into said opening for positioning said radiator.

14. An extendable radio frequency transmission line and antenna structure according to claim 1 in which, one of said longitudinal edges of said tubular structure having an opening therethrough, a dipole element radiator being secured to said conductor and projecting out through said opening, and said radiator being capable of being coiled with said tubular structure.

15. An extendable radio frequency transmission line and antenna structure according to claim 1 in which, said plate having a plurality of longitudinal conductors positioned thereon, said sides and said longitudinal edges of said tubular structure having a plurality of spaced openings along the length thereof, dipole element radiators being secured to ones of said conductors and projecting out through said openings forming an antenna array, and said radiators being capable of being coiled with said tubular structure.

16. An extendable radio frequency transmission line and antenna structure according to claim 1 in which, said plate having a pair of longitudinal conductors positioned thereon, one of said longitudinal edges having at least one opening therethrough, a pair of rod shaped radiators being secured to respective ones of said conductors and projecting out through said opening, the projecting ends of said radiators being connected by a loop element forming a loop antenna array, and said loop antenna array being capable of being coiled with said tubular structure.

17. An extendable radio frequency transmission line and antenna structure accordance to claim 1 in which, one of said sides has at least one opening, a loop element radiator, one end of said radiator projecting through said opening and being electrically connected to said conductor and the other end of said radiator being connected to the other of said sides.

18. An extendable radio frequency transmission line and antenna structure according to claim 1 including, reel means for storing and compressing said tubular structure in a retained coil and selectively unwinding and extending said tubular structure.

19. An extendable radio frequency transmission line and antenna structure according to claim 18, including, means for supplying radio frequency energy to said tubular structure.

20. An extendable radio frequency transmission line and antenna structure according to claim 1 in which, a portion of said tubular structure having means for radiating radio frequency energy.

21. An extendable radio frequency transmission line and antenna structure according to claim 1 in which, said sides being preformed to spring outwardly and to draw said longitudinal edges inwardly a distance greater than the width of said insulator plate, whereby said insulator plate limits the expansion of said tubular structure.

22. An extendable radio frequency transmission line and antenna structure comprising, a longitudinal tubular structure for transmitting radio frequency energy having aligned sides of thin spring material that are joined at their longitudinal edges, said sides being radio frequency conducting and being preformed to spring outwardly to a curved configuration upon being released forming a tube and to be compressed to a substantially flattened position, said tubular structure being capable in the compressed condition of being flexed into a coil and upon release to spring into a longitudinal tubular structure, and at least one of said sides having a radio frequency energy radiator comprising slots in the conducting portion of said side.

References Cited

UNITED STATES PATENTS

| | | | |
|---|---|---|---|
| 2,622,199 | 12/1952 | Ramsay et al. | 343—771 |
| 2,679,590 | 5/1954 | Riblet | 343—771 |
| 3,331,075 | 7/1967 | Moulton | 343—877 X |
| 3,364,488 | 1/1968 | Perenic et al. | 343—877 X |
| 3,434,254 | 3/1969 | Rubin | 343—877 X |

HERMAN KARL SAALBACH, Primary Examiner

M. NUSSBAUM, Assistant Examiner

U.S. Cl. X.R.

343—877, 880